(12) United States Patent
Graichen et al.

(10) Patent No.: US 9,671,034 B2
(45) Date of Patent: Jun. 6, 2017

(54) PISTON ACTUATOR CONTROLLING A VALVE AND METHOD FOR OPERATING THE SAME

(71) Applicants: Brian M. Graichen, Leonard, MI (US); Dave Fletcher, Flint, MI (US); Matt Gilmer, Whitmore Lake, MI (US); James H. Miller, Ortonville, MI (US); Keith Hampton, Ann Arbor, MI (US)

(72) Inventors: Brian M. Graichen, Leonard, MI (US); Dave Fletcher, Flint, MI (US); Matt Gilmer, Whitmore Lake, MI (US); James H. Miller, Ortonville, MI (US); Keith Hampton, Ann Arbor, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 67 days.

(21) Appl. No.: 14/154,268

(22) Filed: Jan. 14, 2014

(65) Prior Publication Data
US 2014/0197345 A1 Jul. 17, 2014

Related U.S. Application Data

(60) Provisional application No. 61/752,291, filed on Jan. 14, 2013, provisional application No. 61/894,159, filed on Oct. 22, 2013.

(51) Int. Cl.
*F16K 31/08* (2006.01)
*F16K 31/122* (2006.01)
*F16K 3/02* (2006.01)

(52) U.S. Cl.
CPC .......... *F16K 31/084* (2013.01); *F16K 3/0254* (2013.01); *F16K 31/1221* (2013.01)

(58) Field of Classification Search
CPC ... F16K 3/0254; F16K 31/1221; F16K 31/084
(Continued)

(56) References Cited

U.S. PATENT DOCUMENTS 180,451 A * 8/1876 Washington .................... 65/301
930,860 A * 8/1909 Horridge ........................ 251/62
(Continued)

FOREIGN PATENT DOCUMENTS

CN 102292582 A 12/2011
DE 102009032958 1/2011
(Continued)

OTHER PUBLICATIONS

PCT, International Search Report and Written Opinion, PCT/US2014/011385 (May 20, 2014).
(Continued)

*Primary Examiner* — Umashankar Venkatesan
(74) *Attorney, Agent, or Firm* — Thompson Hine LLP (57) ABSTRACT

Piston actuators and methods of its operation are described. The piston actuators include a housing defining a chamber having a piston therein and a spring seated against the piston to bias it into a starting position. The piston includes a ferromagnetic material, a magnet or both and a secondary magnet or ferromagnetic material, forming a first magnetic/ferromagnetic pair with the piston, is positioned to maintain the piston in a secondary position. A tertiary magnet or ferromagnetic material, forming a second magnetic/ferromagnetic pair with the piston, may assist the spring in maintaining the piston in the starting position. During operation, introduction into or removal from the chamber of an amount of fluid sufficient to overcome the force of the spring (and the tertiary magnet or ferromagnetic material) enables the attraction between the members of the first magnetic/
(Continued)

ferromagnetic pair to move the piston to the secondary position as a snap movement.

21 Claims, 6 Drawing Sheets (58) Field of Classification Search
USPC .............................. 251/319, 65, 62, 320, 321
See application file for complete search history.

(56) References Cited

U.S. PATENT DOCUMENTS

| | | | | |
|---|---|---|---|---|
| 2,626,633 | A * | 1/1953 | Wilson | ................ F16K 31/1221 137/467 |
| 2,638,124 | A * | 5/1953 | Nickerson | ........................ 251/62 |
| 3,086,745 | A * | 4/1963 | Natho | .............................. 251/62 |
| 3,518,032 | A * | 6/1970 | Degroff et al. | ............... 417/440 |
| 3,542,332 | A * | 11/1970 | Chevalier et al. | ........... 251/63.6 |
| 3,888,278 | A * | 6/1975 | Hanks | ..................... F16K 11/07 137/625.65 |
| 4,526,341 | A * | 7/1985 | Thomas | .................. F16K 51/02 251/335.3 |
| 4,783,046 | A | 11/1988 | Young et al. | |
| 4,794,890 | A | 1/1989 | Richeson, Jr. | |
| 4,831,973 | A * | 5/1989 | Richeson, Jr. | ............ F01L 9/04 123/90.11 |
| 4,852,528 | A | 8/1989 | Richeson et al. | |
| 4,878,464 | A | 11/1989 | Richeson et al. | |
| 4,899,700 | A | 2/1990 | Richeson, Jr. et al. | |
| 4,942,852 | A | 7/1990 | Richeson et al. | |
| 4,984,541 | A * | 1/1991 | Kawamura | ................ 123/90.11 |
| 5,188,155 | A | 2/1993 | Kremer | |
| 5,261,439 | A * | 11/1993 | Harris | .............. B60K 15/03519 123/516 |
| 5,488,340 | A * | 1/1996 | Maley | ................ F02M 51/0635 335/253 |
| 5,871,027 | A | 2/1999 | Shimizu et al. | |
| 6,021,749 | A * | 2/2000 | Gaisberg | .................. F01L 9/04 123/90.11 |
| 6,076,490 | A * | 6/2000 | Esch | ......................... F01L 9/04 123/90.11 |
| 6,145,806 | A * | 11/2000 | Dettmann | ........................ 251/65 |
| 6,338,469 | B1 * | 1/2002 | Kalsi | .......................... F16K 3/12 251/326 |
| 6,991,211 | B2 | 1/2006 | Altonji | |
| 8,395,374 | B2 | 3/2013 | Newman et al. | |
| 2002/0153501 | A1 | 10/2002 | Yang et al. | |
| 2008/0265189 | A1 | 10/2008 | Bravo | |
| 2010/0163765 | A1 * | 7/2010 | Gregoire | ........................ 251/62 |
| 2010/0236632 | A1 | 9/2010 | Jakobsen | |
| 2011/0030369 | A1 | 2/2011 | Natali | |
| 2011/0057755 | A1 | 3/2011 | Dams | |
| 2012/0305816 | A1 | 12/2012 | Pohlmann et al. | |
| 2014/0053387 | A1 * | 2/2014 | Adams | ................ F16K 31/1221 29/446 |

FOREIGN PATENT DOCUMENTS

| | | |
|---|---|---|
| DE | 102010002109 | 8/2011 |
| EP | 2199565 | 6/2010 |
| EP | 2208893 | 7/2010 |
| EP | 2245723 | 11/2010 |
| FR | 2877067 | 4/2006 |
| GB | 2115670 | 3/1982 |
| JP | H06-002782 | 11/1994 |
| JP | H06-002783 | 11/1994 |
| WO | 2011/006535 | 1/2011 |

OTHER PUBLICATIONS

Norgren, The Norgren Guide to Specifying Pneumatic Actuators Apr. 17, 2012 (Apr. 17, 2012) [retrieved on Apr. 8, 2014 (Apr. 8, 2014)]. Retrieved from the Internet<URL: http://web.archive.org/web/20120417135036/http://resources.norgren.com/document_resources/PDF_links/product_literature/brochures/actuators/actuators_guide/actuator_guide.pdf> pp. 5, 16.

EP, Extended European Search Report and Opinion; European Patent Application No. 14749189.8 (Aug. 5, 2016).

* cited by examiner

PISTON ACTUATOR CONTROLLING A VALVE AND METHOD FOR OPERATING THE SAME

RELATED APPLICATIONS

This application claims the benefit of U.S. Provisional Application No. 61/752,291, filed Jan. 14, 2013, and U.S. Provisional Application No. 61/894,159, filed Oct. 22, 2013.

TECHNICAL FIELD

This application relates to piston actuators that snap between the on and off positions, more particularly to pressure activated and magnetically assisted piston actuators for operation of a valve for use in an internal combustion engine to move the valve between open and closed positions with no lag or "floating" in between said positions.

BACKGROUND

In current actuators the on/off operation in a pneumatic device is achieved with an electric solenoid. Vacuum force is applied to the actuator only when the solenoid is "on" and only when the vacuum force is high enough to move the actuator the full length of its travel. Alternately, without a solenoid controlling the actuator's exposure to vacuum, an actuator exposed to vacuum force under all conditions will "float" between the on position and the off position. Floating is undesirable, inefficient, and provides poor control of the valve attached to the actuator. There is a need to make energy efficient actuators that are effective at controlling a valve without the use of an electric solenoid. The elimination of the solenoid reduces power consumption of the device, its weight, its cost, and complexity.

SUMMARY

Herein actuators are described for the control of valves without the use of a solenoid, but that still have on-off functionality. The actuators will stay in a starting position, which may correspond to either an open or a closed position for an attached valve, until a threshold force is applied to the piston therein. Once the threshold force is reached, the piston will move the full length of its travel to its secondary position, moving the valve to the alternate position from its starting open or closed position, and will remain in this secondary position until a lower threshold force is reached, at which point the piston moves back to its starting position by again moving the full length of its travel. The actuators include a housing defining a chamber and having a port in fluid communication with the chamber, a piston enclosed in the chamber, and a spring seated against the piston to bias the piston into a starting position. The piston at least partially includes one or more of a ferromagnetic material or one or more magnets. A first magnet or a first ferromagnetic material is positioned to assist the spring in maintaining the piston in the starting position and a second magnet or a second ferromagnetic material is positioned to maintain the piston in a secondary position when the piston moves to the secondary position.

The movement of the piston from its starting position to its secondary position may be described as a "snap" movement. This "snap" is a quick, nearly instantaneous movement of the piston the full length of its travel between the starting and secondary positions without a lag or floating of the piston therebetween. The "snap" action of the actuator as it travels between the starting position and the secondary position is facilitated by the presence of the magnets, which attract and pull the piston between the two positions. This is such a quick movement that without bumpers to reduce the noise, a snap-like sound can be heard as the piston contacts the housing as it arrives in the alternate position, which depending on the configuration of the actuator may be an "on" or an "off" position of the attached valve.

In one embodiment, the piston actuator includes a housing defining a chamber and comprising a port in fluid communication with the chamber, a piston within the chamber and having a ferromagnetic material, a magnet or both included in the piston, a spring seated against the piston to bias the piston into a starting position, and a secondary magnet or ferromagnetic material forming a first magnetic/ferromagnetic pair with the piston and positioned to maintain the piston in a secondary position once the piston moves to the secondary position. During operation, the introduction into or removal from the chamber of an amount of fluid sufficient to overcome the force of the spring enables the attraction between the members of the first magnetic/ferromagnetic pair to move the piston to the secondary position as a snap movement. The first magnetic/ferromagnetic pair thereafter maintains the piston in the secondary position until the amount of fluid introduced into or removed from the chamber is sufficient to overcome the attraction therebetween. Once the attraction of the first magnetic/ferromagnetic pair is overcome, the spring moves the piston to the starting position.

In another embodiment, the actuator described above also includes a tertiary magnet or ferromagnetic material forming a second magnetic/ferromagnetic pair with the piston. The tertiary magnet or ferromagnetic material is positioned to assist the spring in maintaining the piston in the starting position. Accordingly, during operation, the introduction into or removal from the chamber of an amount of fluid sufficient to overcome the force of the spring and the second magnetic/ferromagnetic pair enables the attraction between the members of the first magnetic/ferromagnetic pair to move the piston to the secondary position as a snap movement. The first magnetic/ferromagnetic pair thereafter maintains the piston in the secondary position until the amount of fluid introduced into or removed from the chamber is sufficient to overcome the attraction therebetween. Once the attraction of the first magnetic/ferromagnetic pair is overcome, the spring and the attraction between the members of the second magnetic/ferromagnetic pair move the piston to the starting position as a snap movement.

Methods for operating the piston actuators are also described herein. The methods include providing one of the piston actuators and firstly introducing into or removing from the chamber an amount of fluid sufficient to overcome the force of the spring or the force of the spring and the attraction between a second magnetic/ferromagnetic pair (if present) holding the piston in the starting position, and thereby the attraction between the members of the first magnetic/ferromagnetic pair moves the piston to the secondary position as a snap movement and thereafter maintains the piston in the secondary position. The method also includes, oppositely of whichever firstly introducing into or removing of an amount of fluid was performed, subsequently introducing into or removing from the chamber an amount of fluid sufficient to overcome the attraction between the second magnetic/ferromagnetic pair, and thereby the spring and the attraction between the members of the second magnetic/ferromagnetic pair move the piston to the starting position as a snap movement.

DETAILED DESCRIPTION

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

Figure 1:
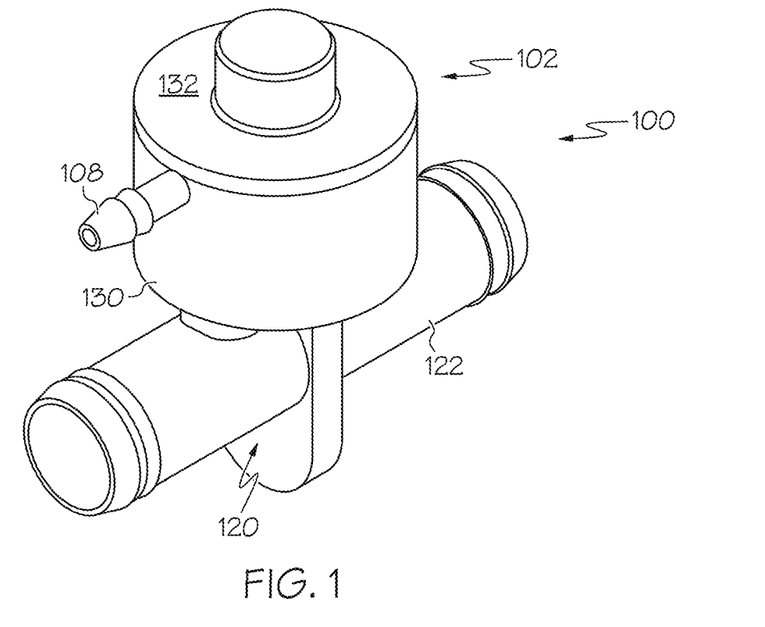
FIG. 1 is a front perspective view of one embodiment of a snap actuator and valve.
Figure 2:
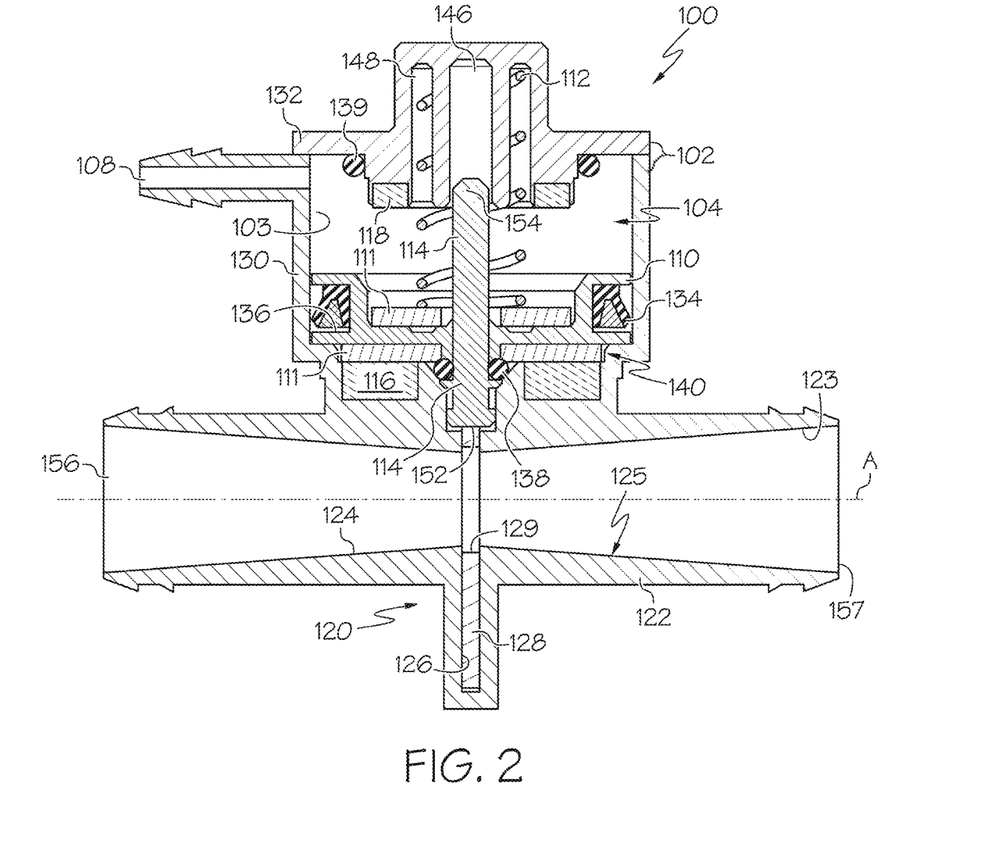
FIG. 2 is a cross-sectional view of the snap actuator and valve of FIG. 1 taken along the longitudinal axis of the conduit portion of the valve with the valve in a starting position.

FIGS. 1-4 illustrate one embodiment of a device 100 for use in an internal combustion engine. In one embodiment, the device 100 is included in a brake vacuum boost system. The device 100 includes a housing 102 that includes a container portion 130 and a cap 132 defining an internal chamber 103 (FIG. 2) and having a port 108 in fluid communication with the chamber 103. As seen in FIGS. 1 and 2, the port 108 enters the housing 102 through the container portion 130. However, in the alternate embodiment illustrated in FIG. 5, the housing 102' again includes a container portion 130 and a cap 132, but here the port 108' enters the housing 102' through the cap 132. Preferably, the cap 132 is sealingly connected to the container portion 130 in both embodiments.

Figure 3:
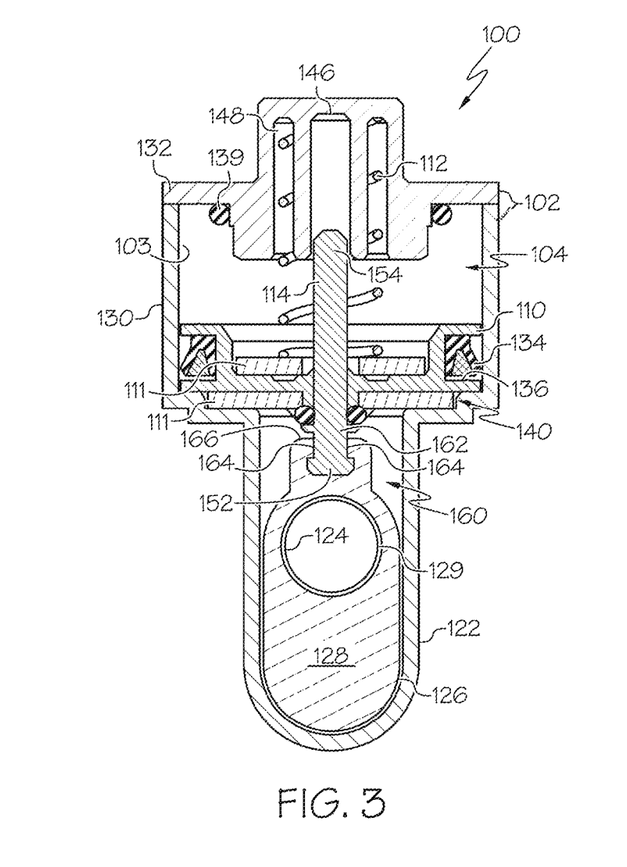
FIG. 3 is a cross-sectional view of the snap actuator and valve transverse to the longitudinal axis of the conduit through the gate member, with the valve in a starting position.
Figure 4:
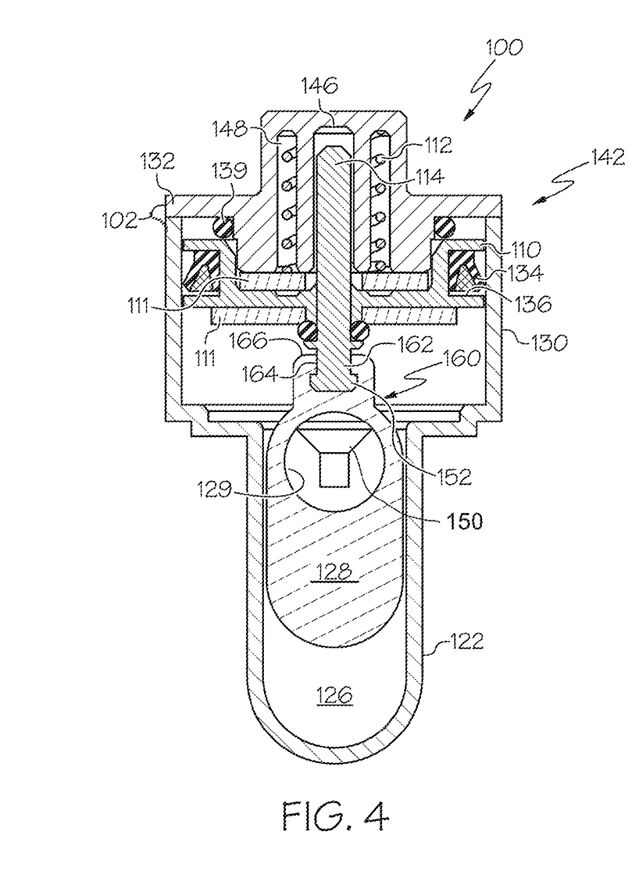
FIG. 4 is a cross-sectional view of the snap actuator and valve transverse to the longitudinal axis of the conduit through the gate member, with the valve in a secondary position.

Referring to FIGS. 2-4, housed within the container portion 130 is an actuator 104 that includes a piston 110 having a stem 114 connectable to a valve mechanism 120. The stem 114 has a proximal end 152 proximate to the valve mechanism 120 and a distal end 154 removed from the valve mechanism 120 (labeled in FIG. 2). The valve mechanism 120, in this embodiment, includes a conduit 122 having a valve opening 124 and a pocket 126 and includes a gate member 128 at least partially receivable in the pocket 126 and having a passage 129 therethrough. Other valves may be connected to the actuator 104 such as a poppet valve, a butterfly valve, or other known valves.

Figure 5:
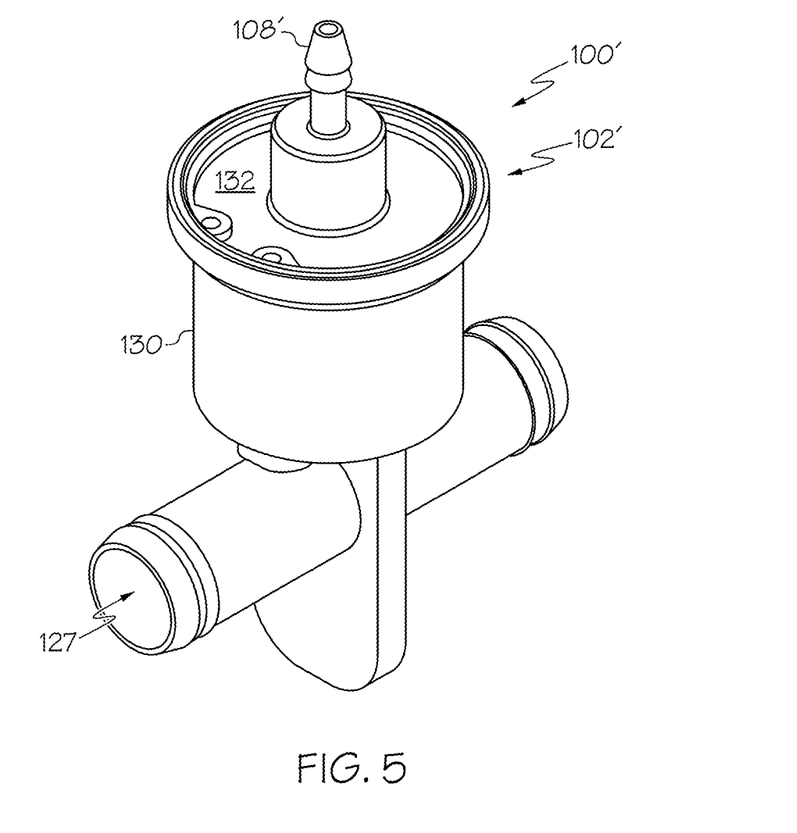
FIG. 5 is a front perspective view of another embodiment of a snap actuator and valve.

As seen in FIG. 2, the conduit 122 may be a tube that has a bore 123 that continuously, gradually tapers or narrows from both ends 156, 157 toward the valve opening 124, thereby having its smallest inner dimension at the valve opening 124. The bore may be any circular shape, ellipse shape, or some other polygonal form and the gradually, continuously tapering inner dimensions may define, but is not limited to, a hyperboloid or a cone. This hour glass-shaped cross-section 125 of the bore 123, centered at the valve opening 124, reduces the required gate travel. In another embodiment, as seen in FIG. 5, the conduit 122 may have a uniform inner diameter 127 along its entire length.

In the embodiment of FIGS. 1-4, with the valve mechanism 120 having a gate member 128, the gate member 128 is connected to the piston 110 by a rail system 160, as most easily understood from FIGS. 3 and 4, providing sliding movement of the gate member 128 along the longitudinal axis A (FIG. 2) of the conduit 122 thereby forming a seal within the conduit 122 in response to pressure within the conduit 122. The rail system 160 (best seen in FIGS. 3 and 4) includes a guide rail 162 near the proximal end 152 of stem 114. The guide rail 162 includes raceway grooves 164 on opposing sides thereof. The gate member 128 includes a slider 166 shaped and configured to fit over the guide rail 162 and conform to the raceway grooves 164.

The actuator 104 controls the opening and closing of the valve mechanism 120, in particular the gate member 128, in FIGS. 2-4, by the movement of the piston 110. As seen in FIGS. 3 and 4, the piston 110 is movable between a starting position 140 (FIG. 3) and a secondary position 142 (FIG. 4). The starting position 140 in this embodiment (FIG. 3) is an open position of the valve mechanism 120. In other embodiments, the starting position may be a closed position of the valve. The piston 110 at least partially includes a magnetically-attractable material 111, also referred to as a ferromagnetic material, such that the piston 110 is attractable to a first magnet 116 and a second magnet 118 (seen in the cross-section of FIG. 2). A spring 112 is seated against the piston 110 to bias the piston 110 generally into the starting position 140 (FIGS. 2 and 3) and the first magnet 116 is positioned to assist the spring 112 in maintaining the piston 110 in the starting position 140. The second magnet 118 is positioned to maintain the piston 110 in the secondary position 142 (FIG. 4), when the piston 110 moves to the secondary position 142.

The stem 114 of the piston may also extend therefrom opposite the valve mechanism, and, as seen in FIGS. 2-4, be received in a guide channel 146 within the cap 132. The cap 132 may also include a seat 148 for the spring 112. These features of the cap 132 provide alignment to the actuator and prevent twisting and/or buckling of the spring and piston.

The actuator 104 may include a first bumper 138 positioned to reduce noise between the piston 110 and the housing 102 when arriving in the starting position 140 (FIGS. 2 and 3) and a second bumper 139 positioned to reduce noise between the piston 110 and the housing 102 when arriving in the secondary position 142 (FIG. 4). In one embodiment, opening 150 (between the housing 102 and the valve mechanism 120) may be defined by a generally frustoconical surface and the first bumper 138 may be disposed proximate to the opening 150. The first and second bumpers 138, 139 may be seated in annular grooves within the housing 102 or on a component of the piston 110, such as the stem 114.

Still referring to FIGS. 2-4, the piston 110 may also include a sealing member 134 about its outer periphery as a lip seal against the interior surface of the container portion 130. The outer periphery of the piston 110 may include an annular groove 136 in which to seat the sealing member 134. In one embodiment, the sealing member 134 may be an O-ring, a V-ring, or an X-ring. Alternately, the sealing member 134 may be any other annular seal made of sealing material for sealing engagement against another member.

In operation, the actuator 104 moves the piston 110 by the introduction of fluid into or the removal of fluid from the chamber 103 via the port 108 and the assistance of the magnets 116, 118 and the spring 112. The piston 110 is seated in a starting position 140 (FIG. 3) and remains in this position held there by the spring force and the magnetic force of the first magnet 116, which may correspond to either an open or a closed position for an attached valve, until a threshold force is applied to the piston 110 that overcomes the spring force and magnetic force of the first magnet 116. Once this threshold force is reached, the piston 110 will move the full length of its travel to its secondary position 142 (FIG. 4) with the assistance of the magnetic force of the second magnet 118, which thereafter maintains the piston 110 in the secondary position 142. The movement of the piston 110 through its full length of travel is a quick, nearly instantaneous movement substantially without pause therebetween, i.e., there is no lag or floating of the piston in between the starting position 140 and the secondary position 142, which may be described as a "snap" movement of the piston. This "snap," which without bumpers is an audible sound, is a result of the magnetic attraction of the second magnet 118 attracting the piston 110 to and into contact with the second magnet 118, which acts to quickly move the piston to the secondary position 142. The second magnet 118 thereafter holds or maintains the piston 110 in the secondary position until a lower threshold force is reached, at which point the piston moves back to its starting position 140 by again moving the full length of its travel as a snap-type movement, which requires any fluid present under the piston 110 (FIG. 4) to exit the housing; otherwise, the fluid would create a pressure preventing the snap-type movement.

In one embodiment, the first magnet 116 and the second magnet 118 both may be one or more discrete magnets. In another embodiment, the first magnet 116, the second magnet 118, or both may be an annular magnet.

Figure 6A:
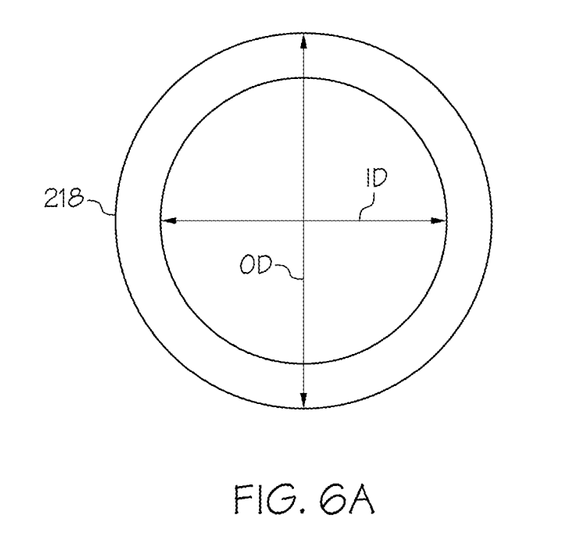
FIG. 6A is a top plan view of an annular magnet.
Figure 6B:
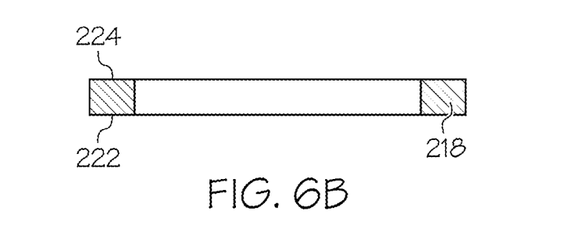
FIG. 6B is a longitudinal cross-section of the annular magnet in FIG. 6A.
Figure 7:
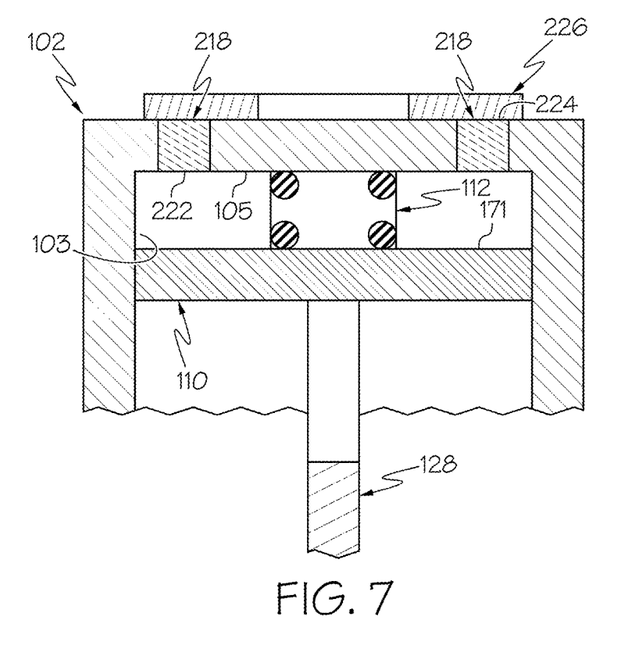
FIG. 7 is a longitudinal cross-section of one embodiment of a snap actuator.

In FIGS. 6A through 7, an annular magnet 218 in the position of the second magnet 118 in FIG. 2, is described as illustrative, but is equally applicable to the first magnet 116. The annular magnet 218 has an inner diameter ID and an outer diameter OD, and typically has a uniform thickness or height. Any one or more of these dimensions may be selectively varied to change the magnetic force acting to attract the piston. The annular magnet 218 may include a corrosion resistant coating applied to its exterior surfaces 222, 224. As a result of the annular shape of the magnet, the magnetic force generated by the magnet is uniform circumferentially against the piston, which means that the flux, or magnetic force per unit area, of the magnet face can be less than required when the first or second magnets 116, 118 are each one or more discrete magnets. This allows the first magnets to be thinner, which also beneficially reduces cost.

In the embodiment illustrated in FIG. 7, the upper portion of the housing 102 of the actuator 100, which may be part of a cap, includes the annular magnet 218 and, optionally, a plate 226 disposed adjacent to a second surface 224 of the annular magnet 218 that is opposite a first surface 222 that is most proximate the piston 110. The plate 226 is mounted against the exterior surface of the housing 102 to direct the magnetic flux emanating from the annular magnet 218 (or the one or more magnets illustrated in FIGS. 2 and 3) around toward the inside of the actuator to increase the overall attractive force acting on the piston 110 and as such must be composed of a material suitable for directing the magnetic flux. In one embodiment, the plate 226 may be an annular plate having an inner diameter, an outer diameter, and a thickness or height. The size and shape of the plate 226 is selected to act on the magnetic flux as described above and is tunable by changing the size and shape thereof. In one embodiment, the plate 226 is a steel annular ring. The addition of the optional plate 226 increases the overall force generated by the magnet that is available to act upon the piston 110 by providing a magnetically conductive path for the flux to be redirected toward the piston 110. This provides the advantage of increasing the magnetic force and increasing the rate of change of the magnetic force as the piston 110 moves away from the annular magnet 218 (or the one or more magnets). This beneficially allows for smaller and/or cheaper magnets in the actuator.

As seen in FIG. 7, the thickness of the annular magnet 218 may have a thickness substantially equal to the height of the portion of the housing in which it is present. Substantially equal, with respect to this embodiment, means that the thickness of the annular magnet 218 is at least 90% of the thickness of the portion of the housing it is included in. The annular magnet 218 is contained as part of housing 102 in a manner that provides a pressure tight seal so that a vacuum can be connected to chamber 103 above the piston 110.

The annular magnet 218 may be placed into a mold in an injection molding machine and a plastic material is injection molded thereto. The mold may be constructed to enable the plastic to be injection molded inside the inner diameter of the annular magnet 218 as well as around its outer surface that defines the outer diameter. The annular magnet 218 may include surface features (not shown) to enhance the bond between the injection molded plastic material and the material of the annular magnet.

In one embodiment, the annular magnet 218 may be a solid ring of ceramic or ferrite magnetic material. In another embodiment, the annular magnet 218 may be formed by injection molding a mixture of a binder, such as a plastic material, and a magnetic powder that includes, but is not limited to, neodymium, ferrite, or mixtures thereof. In one embodiment, the binder may be a Nylon 6, Nylon 6/6, Nylon 12, or polyphenylene sulfide (PPS) mixed with a neodymium material such as neodymium iron boron (NdFeB). Injection molded neodymium iron boron (NdFeB) magnets may be manufactured by an injection process of pre-mixed magnetic powder with thermoplastic binders which produces an accurate and homogeneous magnetic part. A benefit to this method is that various shapes of magnets can be directly molded into or over components of the actuator thereby eliminating some steps in assembly. With the injection mold process very complex shaped magnets can be achieved with extremely tight tolerances and a broad range of magnetic properties and characteristics. Injection molded magnets are also beneficial because they have good corrosion resistance in water and industrial solvents. In one embodiment, the injection molding method includes a hot runner system to minimize waste/scrap of the magnet powder. If this process is used to manufacture just the annular magnet 218, rather than building it into or on a part of the actuator, the magnet, after formation, may be transferred to a mold in the shape of the housing 102 or a portion thereof in an injection molding machine and over-molded with a selected injection moldable material.

In an alternate embodiment, the annular magnet 218 may be formed from one of the magnetic powders disclosed above in a sintering process and after formation, the magnet is transferred to a mold in the shape of a portion of the housing 102 in an injection molding machine and is over-molded with a selected injection moldable material. As with the injection molding discussed above, the magnet may include surface features (not shown) to increase the bond between the injection moldable material and the magnet.

Still referring to FIG. 7, the first surface 222 of the annular magnet 218 is flush with a first interior surface 105 of the housing 102 in the portion thereof in which the annular magnet is contained. This first interior surface 105 is the wall disposed above the piston's upper surface 171. This construction allows the first surface 222 of the annular magnet 218 to have physical contact with the piston's upper surface 171, which increases the force generated by the magnet when the piston is in contact therewith and also provides a seal for the vacuum. As a result, less magnetic material may be used in the magnet, but still have an effective magnetic force.

The surface features of the magnets in any of the embodiments disclosed herein may include surface texture and/or other irregularities in the surfaces thereof such as protrusion, detents, recesses, etc. so that the injection moldable material attaches firmly to the magnet.

Figure 8:
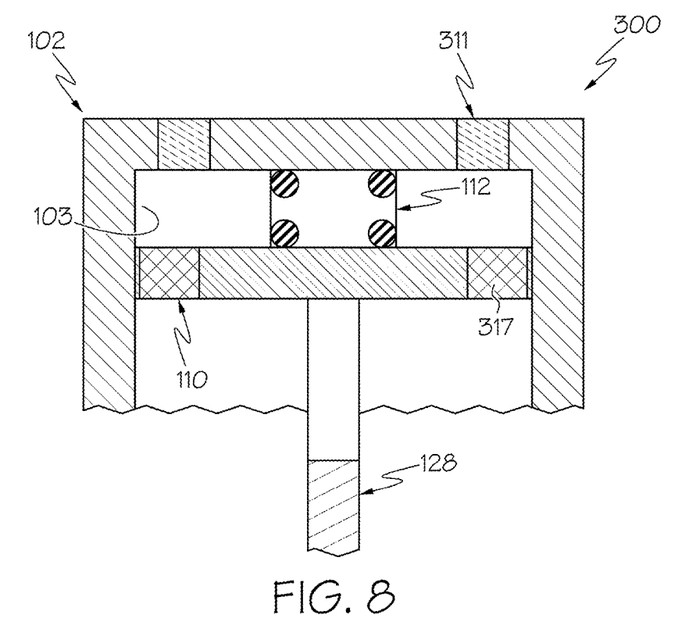
FIG. 8 is a longitudinal cross-section of another embodiment of a snap actuator.

While the embodiments herein have been illustrated and described as having the magnets in the housing and the ferromagnetic material as part of the piston, the opposite configuration is also suitable. As such, one or more magnets or an annular magnet 317 may be included in the piston 110 and ferromagnetic material 311 may be part of the housing as illustrated in FIG. 8. The actuator, designated by the reference number 300, still operates as described above with respect to the other embodiments.

An advantage to the present actuator is that it is tunable. The threshold force can be tuned to the magnetic force of the first and second magnets, the spring force and spring rate, the piston diameter, which are balanced against the friction forces and gravitational forces acting on the piston and the valve.

Having described the invention in detail and by reference to preferred embodiments thereof, it will be apparent that modifications and variations are possible without departing from the scope of the invention which is defined in the appended claims.

What is claimed is:

1. A piston actuator comprising:
   a housing defining a chamber having an upper surface, the housing comprising a port in fluid communication with the chamber;
   a cap sealingly connected to the housing, the cap defining the upper surface within the chamber;
   a piston at least partially comprising a ferromagnetic material, a magnet or both thereof, the piston defining an upper piston surface;
   a spring seated against the piston to bias the piston into a starting position;
   a secondary magnet or ferromagnetic material forming a first magnetic/ferromagnetic pair with the piston and positioned to maintain the piston in a secondary position once the piston moves to the secondary position, the secondary magnet being part of the cap and defining a surface that is flush with the upper surface of the chamber of the housing, wherein the upper surface of the chamber of the housing and the upper piston surface contact one another when the piston is in the secondary position to create a seal for vacuum; and
   a tertiary magnet or ferromagnetic material forming a second magnetic/ferromagnetic pair with the piston and positioned to assist the spring in maintaining the piston in the starting position;
   wherein the piston is disposed within the housing in sealed relation with an interior surface of the housing, thereby, depending upon the position of the piston, dividing the chamber into a first portion housing the spring and in fluid communication with the port and a second portion on a side of the piston opposite the port and spring;
   wherein, when removal of fluid from the first portion of the chamber via the port overcomes the force of the spring and the attraction between the second magnetic/ferromagnetic pair holding the piston in the starting position, the attraction between the members of the first magnetic/ferromagnetic pair moves the piston to the secondary position as a snap movement, and thereafter maintains the piston in the secondary position, and when the introduction of fluid into the first portion of the chamber via the port overcomes the attraction between the first magnetic/ferromagnetic pair, the spring and the attraction between the members of the second magnetic/ferromagnetic pair move the piston to the starting position as a snap movement.

2. The piston actuator of claim 1, wherein the port enters the chamber through the cap.

3. The piston actuator of claim 1, wherein the piston includes a sealing member about its outer periphery.

4. The piston actuator of claim 1, further comprising:
   one or more bumpers positioned to contact the piston in the starting position or the secondary position to reduce noise made by the piston arriving in either of said positions.

5. The piston actuator of claim 1, further comprising:
   a valve operatively connected to the piston.

6. The piston actuator of claim 5, wherein the valve is a gate valve comprising a conduit and a gate member.

7. The piston actuator of claim 6, wherein the gate member is connected to the piston by a rail system providing sliding movement of the gate member along a longitudinal axis of the conduit thereby forming a seal within the conduit.

8. The piston actuator of claim 7, wherein the conduit tapers from both ends toward the valve opening, thereby having its smallest diameter at the valve opening.

9. The piston actuator of claim 5, wherein the valve is a poppet valve or a butterfly valve.

10. The piston actuator of claim 1, wherein at least one of the magnets in the piston and the secondary magnet is generally an annularly shaped magnet.

11. The piston actuator of claim 1, wherein at least one of the magnets in the piston and the secondary magnet is an injection molded magnet.

12. The piston actuator of claim 1, wherein the piston includes the ferromagnetic material, the housing includes the secondary magnet, the secondary magnet having a first major surface proximate the piston and a second major surface opposite the first major surface; and wherein the piston actuator further comprises a plate disposed adjacent to the second major surface of the secondary magnet thereby directing the magnetic flux inward toward the piston.

13. A method for operating a piston actuator, the method comprising:
   providing a piston actuator comprising:
   a housing defining a chamber having an upper surface, the housing comprising a port in fluid communication with the chamber;
   a cap sealingly connected to the housing, the cap defining the upper surface within the chamber;
   a piston at least partially comprising a ferromagnetic material, a magnet or both thereof, the piston defining an upper piston surface;

a spring seated against the piston to bias the piston into a starting position;

a secondary magnet or ferromagnetic material forming a first magnetic/ferromagnetic pair with the piston and positioned to maintain the piston in a secondary position once the piston moves to the secondary position, the secondary magnet being part of the cap and defining a surface that is flush with the upper surface of the chamber of the housing, wherein the upper surface of the chamber of the housing and the upper piston surface contact one another when the piston is in the secondary position to create a seal for vacuum; and a tertiary magnet or ferromagnetic material forming a second magnetic/ferromagnetic pair with the piston and positioned to assist the spring in maintaining the piston in the starting position;

wherein the piston is disposed within the housing in sealed relation with an interior surface of the housing, thereby, depending upon the position of the piston, dividing the chamber into an upper portion housing the spring and in fluid communication with the port and a lower portion on a side of the piston opposite the port and spring;

firstly removing from the upper portion of the chamber an amount of fluid sufficient to overcome the force of the spring and the attraction between the second magnetic/ferromagnetic pair holding the piston in the starting position, and thereby the attraction between the members of the first magnetic/ferromagnetic pair moves the piston to the secondary position as a snap movement and thereafter maintains the piston in the secondary position.

14. The method of claim 13, the method further comprising:

oppositely of the firstly introducing into or removing of an amount of fluid, subsequently introducing into or removing from the upper portion of the chamber an amount of fluid sufficient to overcome the attraction between the first magnetic/ferromagnetic pair, and thereby the spring and the attraction between the members of the second magnetic/ferromagnetic pair move the piston to the starting position as a snap movement.

15. The method of claim 13, wherein the piston actuator further comprises one or more bumpers positioned to contact the piston in the starting position or the secondary position to reduce noise made by the piston arriving in either of said positions.

16. The method of claim 13, wherein the piston actuator further comprises a valve operatively connected to the piston.

17. The method of claim 16, wherein the valve is a gate valve, a poppet valve, or a butterfly valve.

18. An apparatus comprising:
an actuator comprising:
a housing having an upper surface, the housing defining a chamber and a port in fluid communication with the chamber,
a cap sealingly connected to the housing, the cap defining the upper surface within the chamber,
a piston at least partially comprising a ferromagnetic material, a magnet, or both thereof, the piston defining an upper piston surface,
a spring seated against the piston to bias the piston into a starting position, and
a secondary magnet or ferromagnetic material forming a first magnet/ferromagnetic pair with the piston and positioned to maintain the piston in a secondary position once the piston moves to the secondary position, the secondary magnet being part of the cap and defining a surface that is flush with the upper surface of the chamber of the housing, wherein the upper surface of the chamber of the housing and the upper piston surface contact one another when the piston is in the secondary position to create a seal for vacuum,
wherein the piston is disposed within the housing in sealed relation with an interior surface of the housing, thereby, depending upon the position of the piston, dividing the chamber into a first portion housing the spring and a second portion on a side of the piston opposite the spring;
a conduit defining a valve opening and a pocket; and
a gate member operatively connected to the actuator for linear translation within the pocket of the conduit to open and close the valve opening;
wherein the second portion of the chamber is more proximate the conduit and comprises an opening in fluid communication with the conduit.

19. The apparatus of claim 18, wherein the conduit has a bore that continuously, gradually tapers from both ends toward the valve opening.

20. The apparatus of claim 18, wherein the gate member is operatively connected to the actuator for sliding movement of the gate member within the pocket along the longitudinal axis.

21. The apparatus of claim 18, wherein a threshold force applied to the piston that overcomes the spring force moves the piston a full length of travel to the secondary position with the assistance of the magnetic force of the first magnet/ferromagnetic pair, the threshold force comprising a vacuum force to remove fluid from the first portion of the chamber through the port.

* * * * *